Dec. 3, 1946.                M. BRUSTOWSKY                2,412,079
                              SLICING MACHINE
                    Original Filed May 8, 1942      4 Sheets-Sheet 4

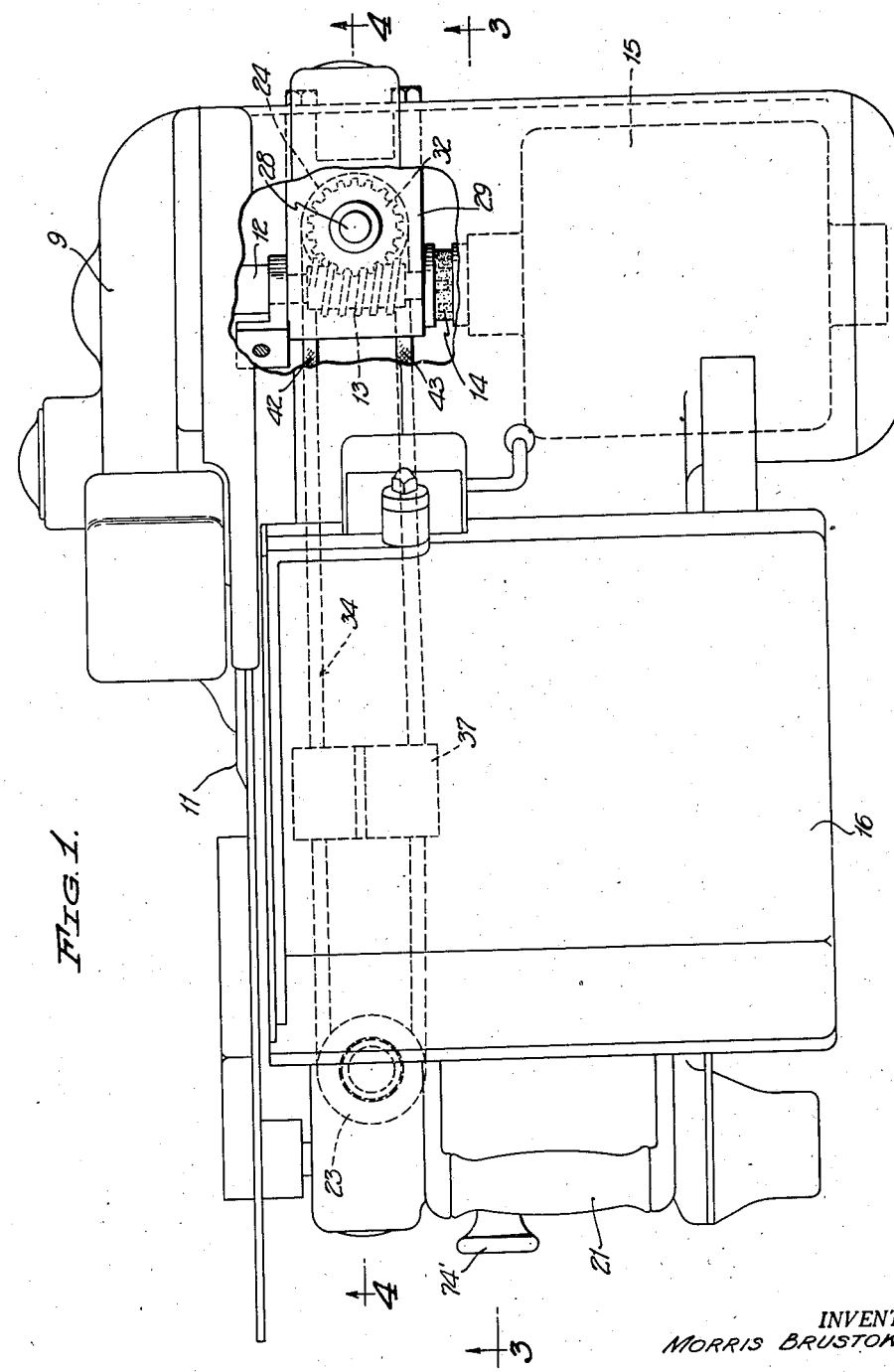

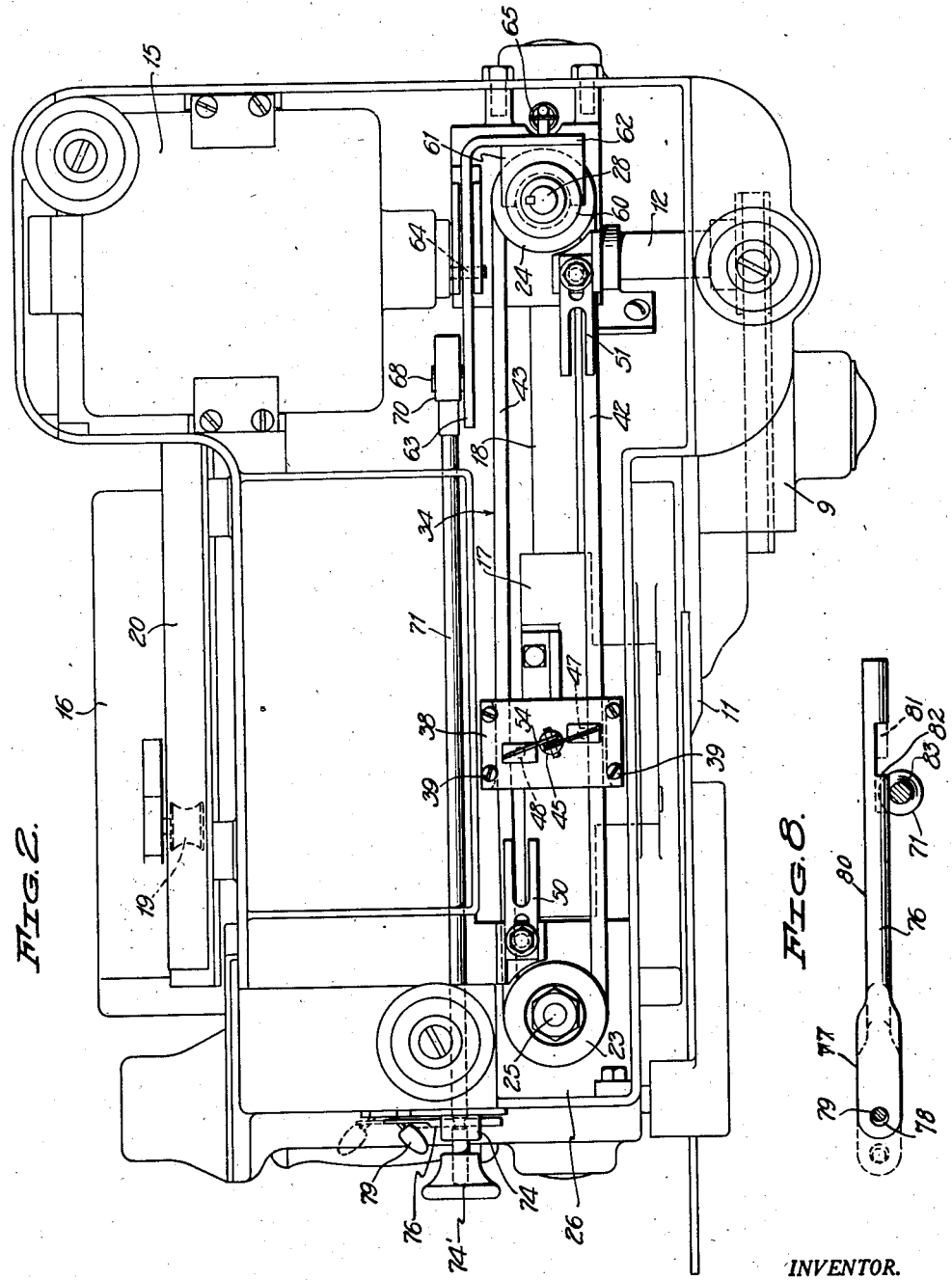

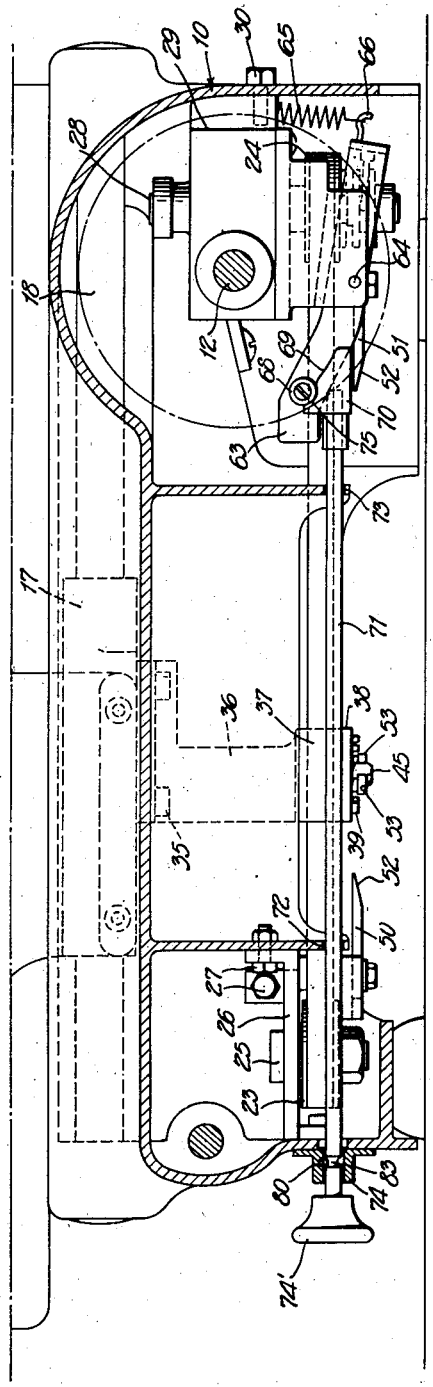

INVENTOR.
MORRIS BRUSTOWSKY.
BY Ely Pattison
ATTORNEYS.

Patented Dec. 3, 1946

2,412,079

UNITED STATES PATENT OFFICE 2,412,079

SLICING MACHINE

Morris Brustowsky, Brooklyn, N. Y., assignor to U. S. Slicing Machine Company, La Porte, Ind., a corporation of Indiana Continuation of application Serial No. 442,186, May 8, 1942. This application February 19, 1944, Serial No. 523,009

8 Claims. (Cl. 146—102)

This invention relates to new and useful improvements in slicing machines and more particularly to slicing machines which employ a reciprocating table or carriage upon which the article to be operated upon is supported and by which the article is moved into and out of engagement with a power driven knife.

In certain of such machines, the reciprocating table or support is operated by hand. In another type, the reciprocating table or support may be operated either by hand or power and it is to this latter type of machine that this invention particularly pertains.

One object of the invention is to improve the construction and mode of operation of slicing machines of the aforementioned type and to provide such machines with mechanism which will enhance the operation thereof.

Another object of the invention is the provision of a novel power operated mechanism for moving the reciprocating table or support into and out of operative relation with the cutting knife.

An additional object of the invention is to provide a novel construction and arrangement of parts whereby the power operated mechanism for reciprocating the table or support may be thrown out of operative relation with the table or support to permit free operation thereof by hand if so desired.

Other objects of the invention relate to certain novel and improved constructions, arrangements and combinations of parts hereinafter described and particularly pointed out in the claims, the advantages of which will be readily understood and appreciated by those skilled in the art.

This application is a continuation of an application for Letters Patent upon a new and useful improvement in a slicing machine filed by this applicant on May 8, 1942, as Serial No. 442,- 186. In addition, this application discloses, but does not claim, the same subject matter disclosed and claimed in a co-pending application for Letters Patent upon a new and useful improvement in a switch control means for a slicing machine filed by applicant on December 22, 1942, as Serial No. 469,797.

The accompanying drawings illustrate one embodiment of a device incorporating the features of the present invention, in which:

Fig. 1 is a top plan view partly broken away for clarity and illustrates a machine of the type described constructed in accordance with the present invention;

Fig. 2 is a bottom elevational view of the machine;

Fig. 3 is a detail longitudinal vertical sectional view on the line 3—3 of Fig. 1;

Fig. 4 is a detail longitudinal vertical sectional view on the line 4—4 of Fig. 1;

Fig. 8 is a detail view of a switch latching means.

Figure 5:
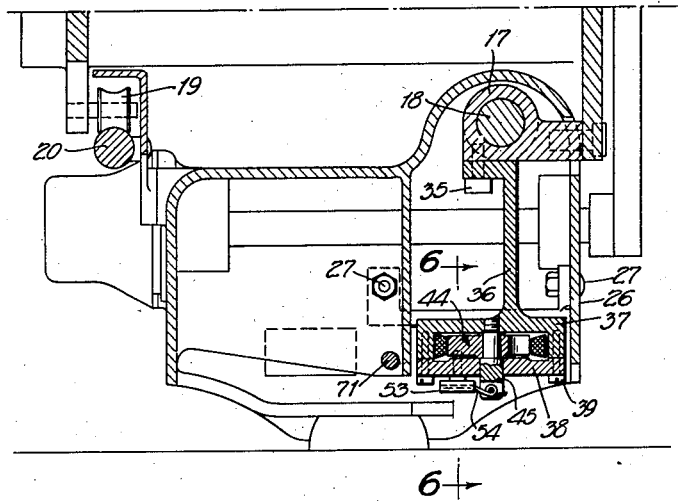
Fig. 5 is a detail transverse vertical sectional view on the line 5—5 of Fig. 3.
Figure 6:
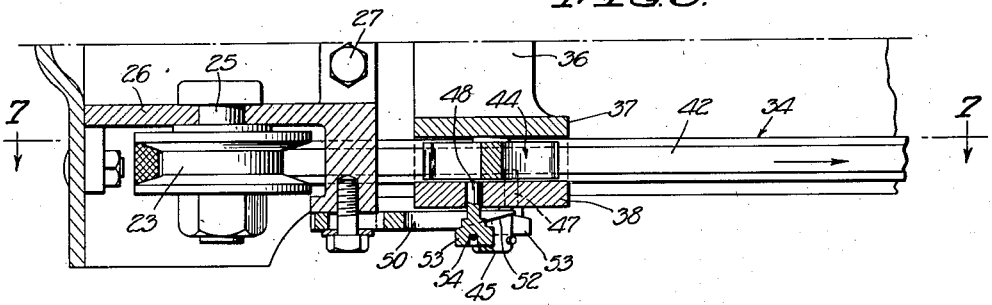
Fig. 6 is an enlarged scale detail sectional view on the line 6—6 of Fig. 5.

The particular device herein disclosed for the purpose of illustrating the present invention is preferably provided with a suitably formed base or frame 10 (Figs. 3 and 4).

Slicing wheel drive

A slicing knife 11 is rotatably mounted at the rear of the machine and is driven from a shaft 12 by means of suitable belt and pulley arrangements within a housing 9 (Fig. 1). The shaft 12 carries a driving worm 13 and is connected by means of a coupling 14, preferably of the flexible type, to the shaft of the motor 15. Operation of the motor rotates the knife to effect the slicing operation.

Reciprocating table mounting

A reciprocating table or support 16 overlies the base of the machine and is mounted for reciprocation past the slicing knife. One side of the table 16 (Fig. 5) is supported by a sleeve-like bearing 17 slidably mounted upon a rod 18 which extends longitudinally within the base of the machine. The other side is supported by a roller 19 which rests upon a rod 20 which extends longitudinally exteriorly of the base and on the right side of the machine when viewed from the front. A handle or grip 21 (Fig. 1) is provided for operating the table or support by hand in lieu of power when desired. When the motor 15 is operating, the knife will be rotated and the table or support may be freely moved by hand back and forth, out of and into operative relation with the knife in such a manner that slices of the article operated upon may be removed by said knife.

Construction of table drive

Means employing the power of the motor 15 to reciprocate the table or support include two pulleys 23 and 24 mounted within the lower portion of the base of the machine (Figs. 3 and 4).

The pulley 23 is carried by a vertically disposed shaft or bolt 25 mounted in a plate or bracket 26 secured within the front part of the base of the machine as at 27.

The pulley 24 is carried near the lower end of a vertically disposed shaft 28 mounted in a housing 29 which is secured within the rear portion of the base of the machine as at 30. A worm gear 32 is mounted within the housing 29 and is carried by the shaft 28. Gear 32 meshes with and is driven by a driving worm 13 mounted upon the drive shaft 12 (Fig. 4). A belt 34 is disposed in a horizontal plane within the base 10 of the machine and is supported by and passes around pulleys 23 and 24.

An arm 36 depends from the sleeve-like bearing 17 for supporting the table and is secured thereto by bolts or the like 35 (Figs. 4 and 5). Upon the lower end of the arm 36 there is a housing 37, one side 38 of which is removably secured to the housing by bolts or the like 39.

The reaches 42, 43 of belt 34 pass through the housing 37 and inwardly with respect to pinch blocks 40 and 41 (Fig. 7), which are carried by the housing 37.

A star wheel 44, mounted within the housing 37 and disposed between the flights 42 and 43 of the belt 34, is freely rotatable upon a shaft 45 and preferably has five arms 46 extending radially therefrom in equally spaced relation to one another.

Means to limit the rotary movement of the star wheel 44 to a step by step motion includes two pins 47 and 48 carried by the housing 37 at diametrically opposite points of the star wheel 44. The pins 47 and 48 are of such length that when they are moved inwardly of the housing they extend between the arms of the star wheel to prevent rotation thereof but to permit rotation thereof when they are withdrawn from the housing.

The pins 47 and 48 are alternately moved inwardly and outwardly with respect to the housing by two stationary cams 50 and 51 carried by the base of the machine. Cam 50 is located just in advance of the pulley 23, whereas cam 51 is located just in advance of the pulley 24. Each of the cams 50 and 51 consists of a bar having a beveled face 52 upon its free end and each of the pins 47 and 48 has a head 53 upon its outer end.

The pins 47 and 48 are normally forced inwardly of the housing 37 by means of springs 54 and the beveled faces of the cams are adapted to engage behind the heads of the pins to withdraw them from the housing against the action of said springs 54.

Figure 7:
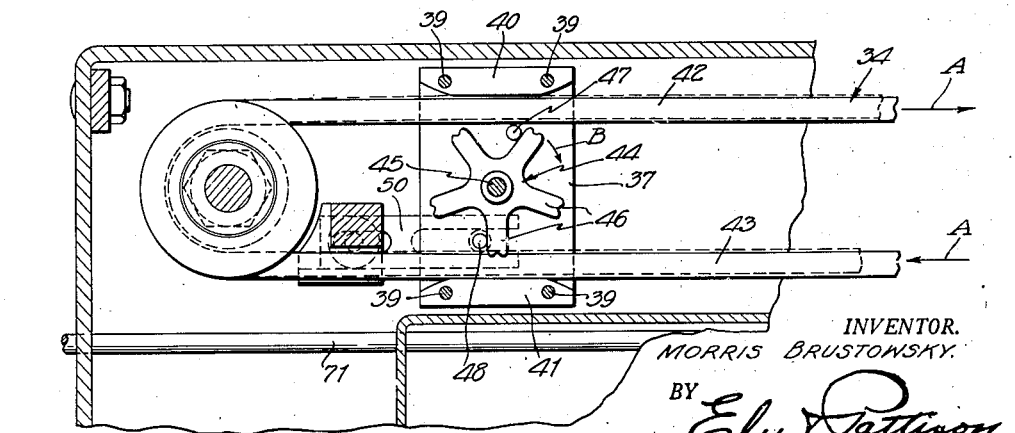
Fig. 7 is a detail horizontal sectional view on the line 7—7 of Fig. 6.

When the belt travels in the direction indicated by the arrows A in Fig. 7, the star wheel 44 moves in a step by step motion in a clockwise direction as indicated by the arrow B in said figure.

The arms 46 of the star wheel 44 are of such length that when one of them is disposed at right angles to one of the reaches of the belt, it will bite the belt and pinch it against the corresponding pinch block 40 or 41, thus locking the housing 37 to one of the reaches of the belt and causing it to move in the direction of movement of that reach of the belt to which it is locked.

*Operation of table drive*

In Fig. 7, the housing 37 is illustrated at substantially the end of its movement to the left with one of the arms 46 in engagement with the pin 48, and also biting the reach 43 against the pinch block 41. At this point, the pin 48 engages the cam 50, the beveled edge 52 of which rides beneath the head 53 of the pin 48 and withdraws the pin 48 outwardly of the housing 37 and out of engagement with that arm of the star wheel which is shown as biting the reach 43 of the belt against the pinch block 41.

As soon as the pin 48 has been disengaged from the star wheel, the star wheel is free to move in a clockwise direction as indicated by the arrow B. As the star wheel starts to rotate, the bite between the arm 46 thereof and the pinch block 41 is relieved and that arm 46 of the star wheel which is shown at the left of the center in Fig. 7 moves first into engagement with the reach 42 of the belt, biting it against the pinch block 40. As the star wheel continues to rotate, the last mentioned arm 46 thereof engages the pin 47 to arrest rotation of the star wheel 44 and to lock the housing 37 to the reach 42 of the belt.

By locking the housing 37 to the reach 42 the belt moves the housing to the right until it reaches the full extent of its movement in this direction. While the housing moved towards the right, the pin 48 (Fig. 7) cleared the cam 50 and was again projected into the housing under the influence of its spring 54, thus positioning it in the path of the next arm of the star wheel which is to bite the reach 43 of the belt when the housing 37 reaches the full extent of its movement to the right.

When the housing has reached its extreme right hand position, the beveled face 52 of the cam 51 (Fig. 4) engages behind the head of the pin 47 and withdraws it to a point where it disengages the star wheel and permits it to turn another step in the clockwise direction to move that arm illustrated at the right of the center in Fig. 7 into biting engagement with the reach 43 of the belt and into engagement with the pin 48 to lock the housing 37 to the belt 34 and move the housing again to the left.

*Clutch for table drive*

As long as the belt 34 is driven, the table or support 16 is reciprocated mechanically before the knife 11. However, when it is desired to operate the table or support 16 by hand, the power operating mechanism may be rendered inoperative by a simple clutch mechanism.

The belt pulley 24 is loosely mounted upon its shaft 28 and is operatively connected thereto by means of a clutch 60 within the rear portion of the base of the machine (Fig. 4). The clutch 60 may be engaged when it is desired to operate the table or support 16 by power.

The fork 61 of the clutch 60 is carried by the right angular extension 62 of a lever 63 pivotally mounted as at 64 on the base or frame 10 (Figs. 2 and 3). A coil spring 65 connected at one end to the right angular extension 62 as at 66 and at its other end as at 67, to the housing 29, tends normally to elevate the lever 63 and maintain the clutch 60 in position to operatively connect the pulley 24 to its shaft 28.

The lever 63 carries a roller 68 which rides the cam face 69 of a cam 70 carried by the inner end of a rod 71. Rod 71 is slidably mounted as at 72 and 73 in the base or frame 10 and extends through a bearing or collar 74. The outer end of rod 74 is provided with an operating knob 74'.

The cam face 69 of the cam 70 is provided with a depressed portion 75 in which the roller 68 of the lever 63 may rest when the rod 71 is in its innermost position (Fig. 3). When the rod 71 is in its innermost position, the lever 63 is held in position against the tension of the spring 65 to maintain the clutch in its releasing position because the roller 68 rests in the depressed portion 75 of the cam face 69 of the cam 70.

Switch mechanism

Lever 79 of a snap switch which controls the circuit of the motor 15 in Fig. 2, is shown in full lines in that position in which the motor circuit is open and all parts are at rest and in dotted lines in the position in which the motor circuit is closed and the motor operating. In Fig. 3 the switch lever 79 is in the "off" position and the parts are all at rest. Upon movement of the switch lever 79 to the "on" position, the circuit to the motor is closed. Immediately, the motor begins to operate and the knife is driven thereby.

Switch and clutch operation

When the switch is in its "on" position the motor rotates the knife and the table or support may be moved towards and away from operative relation with the knife by hand by means of the handle 21. The mechanical table drive is disconnected because when the rod 71 is in its innermost position, the clutch 60 disconnects the pulley 24 from its shaft 28 and permits the shaft to run freely within the pulley.

If it is desired to operate the table or support by power, the rod 71 is pulled outwardly (Fig. 3) to dislodge the roller 68 from the curved portion of the cam face 69. The roller then rides down the cam face 69 and permits the lever 63 to move the clutch 60, under the influence of the spring 65, to lock the pulley 24 to its shaft 28, to permit operation of the power operated mechanism for reciprocating the table or support 16.

Switch and clutch interlock

An interlock prevents movement of the switch lever 79 unless the clutch operating mechanism is disengaged, and prevents movement of clutch mechanism when switch is in its "off" position. This interlock includes a latch member 76 (Figs. 2 and 8) which is connected to the switch lever 79, and which comprises a body portion 77 having an opening 78 through which passes the throw lever of the switch 79. A reduced extension 80 projects from the body portion 77 and this extension has a notch or cut-out portion 81 which forms a shoulder such as 82. The extension 80 (Fig. 3) projects through the bearing 74 at right angles to the rod 71 with the notched portion 81 of the latch overlying the rod. The rod 71 is provided with a circumferential groove 83, which is so located that when the rod 71 is in its innermost position, the groove 83 will lie directly beneath the extension 81 of the latch 76. In this position of the rod 71, the clutch is in its pulley releasing position.

The switch lever 79 and the groove 83 of the rod are so related with respect to latch 76, that when the parts are in the position shown in Figure 3 and in full lines in Figure 8, the switch lever 79 may be moved freely to either its "off" or "on" position. The switch lever 79 moves in a direction away from the rod 71 and its operating knob 74', to its "on" position as illustrated in Figure 2 of the drawings.

When the switch lever is in its "off" position (Fig. 8) the shoulder 82 of the notch 81 occupies a position in the groove 83 of the rod 71 and locks the rod 71 against operation so long as the switch lever is in its "off" position.

However, when the switch lever is moved to its "on" position, the latch is moved to the dotted line position shown in Figure 8, freeing the shoulder 82 from the groove 83 of the rod 71, and leaving the rod free for operation of the clutch to connect the pulley 24 to its shaft. If now the rod 71 is moved outwardly to operate the clutch to connect the pulley 24 to its shaft 28, the groove 83 passes out of alignment or registration with the latch 76 and the shoulder 82 of the notch 81 engages the larger diameter of the rod 71 and prevents movement of the switch lever 79 to its "off" position.

Thus when the clutch 60 is in position to lock the pulley 24 to its shaft 28, the motor must be in operation and cannot be cut out of operation until the clutch 60 is moved to its pulley releasing position. Disengaging the clutch by moving the rod inwardly to a point where its groove 83 will aline with the latch 76 permits the shoulder to enter said groove 83, whereby full movement of the switch lever to its "off" position may be effected. Thereafter the rod 71 cannot be moved outwardly to operate the clutch 60, to operatively connect the pulley 24 to its shaft 28 until the switch lever is again moved to its "on" position.

Résumé

From the foregoing it will be apparent that the present invention provides a new and novel operating mechanism for operating the table or support of a slicing machine in which the table or support may be operated either by hand or power.

Furthermore, the invention provides means whereby the power operated driving mechanism of the table or support is maintined inoperative except when the motor is in operation.

Changes may be made in the form, construction and arrangement of the parts without departing from the spirit of the invention or sacrificing any of its advantages, and the right is hereby reserved to make all such changes as fairly fall within the scope of the following claims.

The invention is hereby claimed as follows:

1. In a slicing machine in combination, a base, a supporting table reciprocally mounted on said base, a motor, and a mechanism for mechanically reciprocating the supporting table, said mechanism including an endless belt, means operated by the motor for driving the endless belt continuously in one direction, a housing through which the reaches of the belt pass, means for operatively connecting the housing with the supporting table, and means for operatively connecting the housing alternately with the reaches of the belt to reciprocate the housing by the belt, said means including a pinch block carried by the housing and mounted adjacent each reach of the belt, a star wheel freely rotatable within the housing between the reaches of the belt, the arms of said star wheel being of sufficient length to operatively engage one of the reaches of the belt with its respective pinch block to lock the housing to the belt when the star wheel is rotated to position one of its arms in a plane at right angles to the plane of one of the reaches of the belt, a pair of pins slidably mounted in the housing, means tending to move said pins inwardly of the housing into the path of the arms of the star wheel to prevent rotation thereof to operatively connect the star wheel with the reaches of the belt, and means for alternately moving said pins out of the path of the arms of the star wheel to permit of a step by step movement thereof.

2. In a slicing machine in combination, a base, a supporting table reciprocally mounted on said base, a motor, and a mechanism for mechanically reciprocating the supporting table, said mechanism including an endless belt, means operated by the motor for driving the endless belt continuously in one direction, a housing through which the reaches of the belt pass, means for operatively connecting the housing with the supporting table, and means for operatively connecting the housing alternately with the reaches of the belt to reciprocate the housing by the belt, said means including a pinch block carried by the housing and mounted adjacent each reach of the belt, a star wheel freely rotatable within the housing between the reaches of the belt, the arms of said belt being of sufficient length to operatively engage one of the reaches of the belt with its respective pinch block to lock the housing to the belt when the star wheel is rotated to position one of its arms in a plane at right angles to the plane of one of the reaches of the belt, and alternately operated diametrically opposed means for engagement with the arms of the star wheel to prevent rotation thereof, thereby to connect the star wheel alternately with the reaches of the belt.

3. In a slicing machine in combination, a base, a supporting table reciprocally mounted on said base, a motor, and a mechanism for mechanically reciprocating the supporting table, said mechanism including an endless belt, means operated by the motor for driving said belt, a housing through which the reaches of the belt pass, said housing having an end wall adjacent each of said reaches, means for operatively connecting the housing with the supporting table and means for operatively connecting the housing alternately with the reaches of the belt to reciprocate the housing by the belt, said means including a star wheel freely rotatable in one direction in the housing between the reaches of the belt, the arms of said star wheel being of sufficient length to operatively engage one of the reaches of the belt with its respective adjacent end wall of the housing to lock the housing to the belt when the star wheel is rotated to position one of its arms in a plane at right angles to the plane of the reaches of the belt, means carried by the housing and movable into and out of the path of the arms of the star wheel and means for moving said last mentioned means alternately into and out of the path of the arms of the star wheel to alternately prevent and permit limited rotation thereof.

4. In a slicing machine having a slicing knife and means to rotate the same, a reciprocable table for material to be sliced, an endless driving belt and a reversing clutch transmission including a housing secured to said table, for translating rotary motion for rotating the slicing knife to linear motion for reciprocating the table, means for operatively connecting the housing of said reversing clutch transmission alternately with the reaches of said belt to reciprocate the housing by the belt, said means including a pinch block carried by the housing and mounted adjacent each reach of the belt, a star wheel freely rotatable within the housing between the reaches of the belt, the arms of said star wheel being of sufficient length to operatively engage one of the reaches of the belt with its respective pinch block to lock the housing to the belt when the star wheel is rotated to position one of its arms in a plane at right angles to the plane of one of the reaches of the belt, a pair of pins slidably mounted in the housing, means tending to move said pins inwardly of the housing into the path of the arms of the star wheel to prevent rotation thereof whereby to operatively connect the star wheel with the reaches of the belt, and means for alternately moving said pins out of the path of the arms of the star wheel to permit of a step by step movement thereof.

5. In a slicing machine having a slicing knife and means to rotate the same, a reciprocable table for the material to be sliced, an endless driving belt and a reversing clutch transmission including a housing secured to said table, for translating rotary motion for rotating the slicing knife to linear motion for reciprocating the table, means for operatively connecting the housing of said reversing clutch transmission alternately with the reaches of said belt to reciprocate the housing by the belt, said means including a pinch block carried by the housing and mounted adjacent each reach of the belt, a star wheel freely rotatable within the housing between the reaches of the belt, the arms of said star wheel being of sufficient length to operatively engage one of the reaches of the belt with its respective pinch block whereby to lock the housing to the belt when the star wheel is rotated to position one of its arms in a plane at right angles to the plane of one of the reaches of the belt, and alternately operated diametrically opposed means for engagement with the arms of the star wheel to prevent rotation thereof, thereby to connect the star wheel alternately with the reaches of the belt.

6. In a slicing machine, a reciprocable article carrying table, means for reciprocating the table, said means embodying an endless traveling belt, gripping surfaces carried by said table, individual to and disposed adjacent the respective runs of said belt, a freely rotatable element disposed between the belt runs, said element having circumferentially spaced gripping areas common to the belt runs and adapted to alternately engage the belt runs and cooperate with the respective said gripping surfaces, to grip one of the belt runs therebetween, stop devices, means for projecting said stop devices between the said areas of said element to arrest the rotation of the latter, and means disposed adjacent the ends of the travel of said table for alternately rendering said stop devices inactive.

7. In a slicing machine a slicing knife, means for actuating the knife, a reciprocable table for the material to be sliced, means for reciprocating the table, the last said means embodying a traveling endless belt having a constant direction of movement, means for alternately connecting said table with the opposite runs of said belt, the last said means embodying pinch members common to said belt runs and carried by said table, said pinch members embodying a freely rotatable element, disposed between the belt runs and embodying circumferentially spaced belt engaging portions adapted to cooperate with the respective said surfaces to clamp one of the runs of the belt therebetween, and means for limiting the rotary movement of said element.

8. In a slicing machine a slicing knife, means for actuating the knife, a reciprocable table for the material to be sliced, means for reciprocating the table, the last said means embodying a traveling endless belt having a constant direction of movement, means for alternately connecting said table with the opposite runs of said belt, the last said means embodying pinch members common to said belt runs and carried by said table, said pinch members embodying a freely rotatable element, disposed between the belt runs and embodying circumferentially spaced belt engaging portions adapted to cooperate with the respective said surfaces to clamp one of the runs of the belt therebetween, means for limiting the rotary movement of said element, the last said means embodying stop elements adapted to be alternately positioned in the spaces between adjacent belt engaging portions, and means operable at predetermined points in the travel of said table for alternately rendering said stop elements active and inactive.

MORRIS BRUSTOWSKY.